US008786600B1

(12) United States Patent
Cantlay

(10) Patent No.: US 8,786,600 B1
(45) Date of Patent: Jul. 22, 2014

(54) SYSTEM AND METHOD FOR CONSTRUCTING A DISPLACEMENT-MAPPED SURFACE REPRESENTATION

(75) Inventor: Iain Cantlay, Nottingham (GB)

(73) Assignee: Nvidia Corporation, Santa Clara, CA (US)

(*) Notice: Subject to any disclaimer, the term of this patent is extended or adjusted under 35 U.S.C. 154(b) by 840 days.

(21) Appl. No.: 12/539,360

(22) Filed: Aug. 11, 2009

(51) Int. Cl.
*G06T 15/30* (2011.01)

(52) U.S. Cl.
USPC ........................................................ 345/423

(58) Field of Classification Search
None
See application file for complete search history.

(56) References Cited

PUBLICATIONS

Livny et al. "Displacement Patches for GPU-Oriented View-Dependent Rendering", GRAPP 2008, p. 181-190, Proc. of the third International Conference on Computer Graphics Theory and Application, Jan. 22-25, 2008.*
"K-means Clustering" http://web.archive.org/web/20060916232716/http://www.bimcore.emory.edu/Tutorials/Online/Guides/MACD/Kmeans.htm, Sep. 2006.*
Wesolkowski et al. "Global Color Image Segmentation Strategies: Euclidean Distanc vs. Vector Angle", Neural Networks for Signal Processing IX, 1999, p. 419-428.*
Michael Garland, Andrew Willmott, Paul S. Heckbert, "Hierarchical Face Clustering on Polygonal Surfaces", Proceedings of the 2001 symposium on Interactive 3D graphics, ACM.
C. Dyken, M. Reimers, J. Seland, "Real-Time GPU Silhouette Refinement using adaptively blended Bézier Patches", Computer Graphics Forum, vol. 27 Issue 1, 2007, Blackwell Publishing.

Natalya Tatarchuck, "Real-Time Tessellation on GPU", Siggraph 2007.
Tobias Isenberg, Bert Freudenberg, Nick Halper, Stefan Schlechtweg, Thomas Strothotte, "A Developer's Guide to Silhouette Algorithms for Polygonal Models", IEEE Computer Graphics and Applications, vol. 23 , Issue 4 (Jul. 2003), IEEE Computer Society Press.
Sanjeev J. Koppel and Srinivasa G. Narasimhan, "Clustering Appearance for Scene Analysis", Proceedings of the 2006 IEEE Computer Society Conference on Computer Vision and Pattern Recognition, IEEE Computer Society.
Subodh Kumar, Dinesh Manocha, "Hierarchical Visibility Culling for Spline Models", Proceedings of Graphics Interface '96, Canadian Information Processing Society, 1996.
Michael Kazhdan, Thomas Funkhouser, and Szymon Rusinkiewicz, "Rotation Invariant Spherical Harmonic Representation of 3D Shape Descriptors", Eurographics Symposium on Geometry Processing, Eurographics Association. 2003.
Berthold K. P. Horn, "Extended Gaussian Images", Proceedings of the IEEE, vol. 72, No. 12, Dec. 1984, ACM.
Mihael Ankerst, Gabi Kastenmüller, Hans-Peter Kriegel, Thomas Seidl, "3D Shape Histograms for Similarity Search and Classification in Spatial Databases", Proceedings of the 6th International Symposium on Advances in Spatial Databases 1999, Springer-Verlag.

* cited by examiner

*Primary Examiner* — Xiao Wu
*Assistant Examiner* — Yingchun He

(57) ABSTRACT

A system and method for constructing a displacement-mapped surface representation are presented. An exemplary method includes defining a plurality of local vectors emanating from the displacement-mapped surface, each local vector extending at a local angle from a local position disposed on the displacement-mapped surface. The method further includes determining first and second global vectors for respective first and second subsets of the local vectors, the first global vector determined as a function of the first subset vectors' local positions and local angles, and the second global vector determined as a function of the second subset vectors' local positions and local angles. The first and second global vectors are utilized to form a representation of the displacement-mapped surface.

11 Claims, 9 Drawing Sheets

SYSTEM AND METHOD FOR CONSTRUCTING A DISPLACEMENT-MAPPED SURFACE REPRESENTATION

BACKGROUND

The present invention relates to representation of graphically-rendered surfaces, and more particularly, to systems and methods for constructing a representation of a displacement-mapped surface.

Displacement mapping is a technique used to provide the appearance of shape, height, texture, and depth to graphically-rendered surfaces. Usually, the underlying surface is tessellated to provide a mesh or polygons, and subsequently a displacement mapping is applied to the tessellated mesh to form the final contour and orientation of the surface.

FIG. 1 illustrates a displacement-mapped surface known in the art. The displacement-mapped surface 100 is composed of multiple sections or "patches" 110, each section 110 including a plurality of tessellated polygons arranged in a mesh, whereby the number of tessellated polygons per section depends upon the viewpoint and complexity of the section 110. Some of the sections 110 are of low complexity, and thus have fewer tessellated polygons per section (e.g., 8 polygons×8 polygons), while some sections are of higher complexity, and have a greater number of tessellated polygons per section (e.g., 65 polygons×65 polygons).

In a conventional embodiment, each section 110 is represented using a predetermined number of "floats" (floating point numbers), the predetermined number being, for example, the number of floats needed for representing the most complex section, i.e., 65×65 or 4,225 floats (1 float per tessellated polygon of the 65×65 polygon section) in the illustrated representation. The number of sections 110 included within the surface 100 may be on the order of 100, 10,000, 100,000, 1,000,000 or more, and thus the host system must possess the memory capacity and bandwidth for processing a very large number of floats in order to represent the displacement-mapped surface 100, such an allocation increasing the cost of the host system.

What is needed is a more efficient technique for representing a displacement-mapped surface.

SUMMARY

A system and method for constructing a displacement-mapped surface representation are presented which addresses the foregoing difficulties. An exemplary method includes defining a plurality of local vectors emanating from the displacement-mapped surface, each local vector extending at a local angle from a local position disposed on the displacement-mapped surface. The method further includes determining first and second global vectors for respective first and second subsets of the local vectors, the first global vector determined as a function of the first subset vectors' local positions and local angles, and the second global vector determined as a function of the second subset vectors' local positions and local angles. The first and second global vectors are then utilized to form a representation of the displacement-mapped surface.

These any other features of the invention will be better understood in view of the following figures and corresponding description of exemplary embodiments.

For clarity, previously-described features retain their reference indices in subsequent drawings.

DETAILED DESCRIPTION OF EXEMPLARY EMBODIMENTS

Figure 2A:
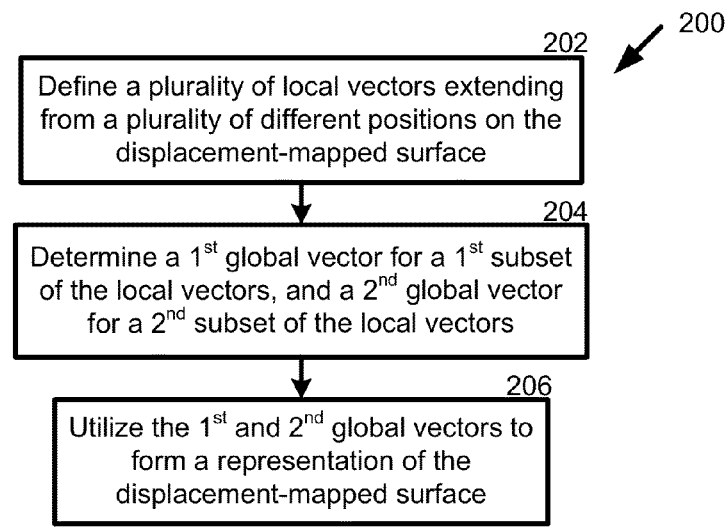
FIG. 2A illustrates a first exemplary method for constructing a displacement-mapped surface representation in accordance with one embodiment of the present invention.

FIG. 2A illustrates a first exemplary method for constructing a displacement-mapped surface representation in accordance with one embodiment of the present invention. At 202, a plurality of local vectors is defined on a displacement-mapped surface, each of the local vectors extending from a respective plurality of different positions disposed on the displacement-mapped surface ("surface" for brevity). Each local vector is characterized by/includes a position (for clarity, a "local position") disposed on the surface from which the local vector extends, and an angle (for clarity, a "local angle") at which the local vector extends relative to a portion of the surface at said local position (the local position surface portion). In an exemplary embodiment illustrated herein, the surface portion is a tessellated polygon of the displacement-mapped surface, the local position is the center point of the tessellated polygon, and the local angle is normal to the surface of the tessellated polygon, such that the local vector extends perpendicularly therefrom. In an alternative embodiment, the local vector extends at an angle different from a perpendicular angle At 204, first and second global vectors are determined for respective first and second subsets of the local vectors. In particular, the first global vector is determined as a function the local positions and local angles of the first subset of local vectors, and the second global vector is determined as a function (i.e., based upon) the local positions and local angles of the second subset of local vectors. Further specifically, the local positions of the first local vectors are used to compute a first global position, and the local angles of the first subset are used to compute a first global angle, the first global position and first global angle forming the first global vector. Similarly, the local positions and local angles of the second subset of local vectors are used to compute respective second global position and second global angle for the second global vector.

Said in another way, each global position is representative of a particular subset of local positions, and each global angle is representative of a particular subset of local angles. In one exemplary embodiment, the first global position represents the collective mean value of the local positions included within the first subset of local vectors. Likewise, the first global angle represents the collective mean value of the local angles included within the first subset of local vectors. Similarly, the second global position represents the collective mean value of the local positions included within the second subset of local vectors, and the second global angle represents the collective mean value of the local angles included within the second subset of local vectors. Other functions may be used to compute the global vectors based upon the local positions and local angles. For example, non-linear functions may be employed, as well as piecewise linear approximations.

It is noted that the global position may be located along, or off of the displacement-mapped surface, depending upon the local positions, and how the global position is determined therefrom. For example if the displacement mapped surface is "flat" (meaning that all local vectors extending therefrom have the same y-axis position value) and the global position is determined as the collective mean of the local values, the global position will also have the same y-axis position value as the local vectors, and thus the global position will be located on the displacement mapped surface. Alternatively, if the displacement mapped surface varies along its y-axis and if the global position is determined as the mean value of such values, the global position may be located off of (e.g., above or below) the displacement-mapped surface.

While the exemplary operation 204 implements two global vectors, a larger number may be implemented, for example, 3, 4, 5, 6, 8, 10, 16, 20, 32, 50, 64, 100, or more. For example, operation 204 may be expanded, whereby a third global vector is determined for a respective third subset of the local vectors, whereby a third global position is determined as a function of the local positions of the third local vector subset and a third global angle is determined as a function of the local angles of the third local vector subset. The choice as to the number of global vectors represents a speed versus quality tradeoff, with a larger number of implemented global vectors providing a higher quality representation, and fewer implemented vectors enabling higher encoding efficiency.

At 206, the first and second global vectors are utilized to provide a representation of the displacement-mapped surface. Said in another way, a representation of the displaced-mapped surface is formed by implementing the first and second global vectors, i.e., the first and second global positions and the first and second global angles. In a further specific embodiment, the displacement-mapped surface representation is constructed excluding references to the local vectors. Further specifically, the representation of the displacement-mapped surface is made exclusively with reference to the first and second global vectors.

Figure 1:
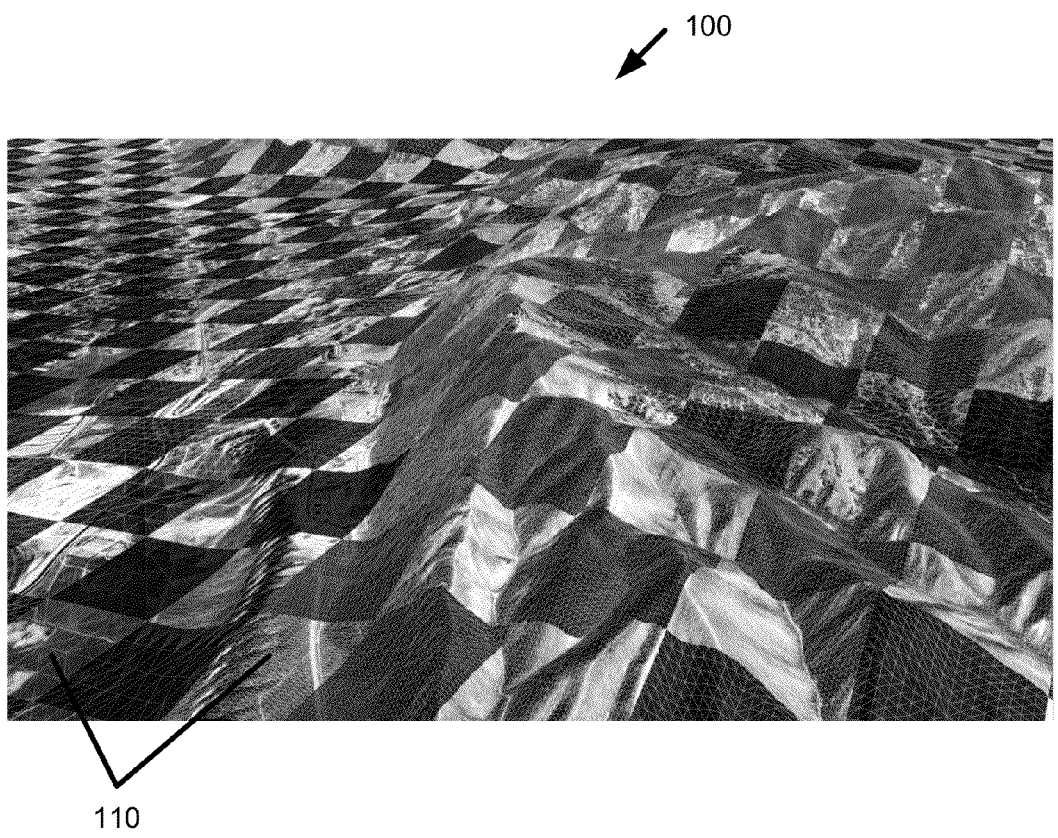
FIG. 1 illustrates a displacement-mapped surface as known in the art.

As illustrated in FIG. 1 above, the displacement-mapped surface may be sub-divided in sections or "patches," with each section comprising a mesh of tessellated polygons. In such an instance, the method of FIG. 2A can be implemented within each section to produce two (or more) global vectors for each section or patch. A representation of the complete displacement-mapped surface can then be constructed by forming a collective array of the global vectors, two or more global vectors representing each section of the displacement-mapped surface, as described above.

The number of global vectors utilized to represent the displacement-mapped surface is selected such that the total number of floats needed is less than the number of floats need to conventionally represent the displacement-mapped surface. For example, in the above example of FIG. 1 in which 65×65 floats are necessary to represent one section/patch of a displacement-mapped surface, the present invention may exemplary employ 2 global vectors to represent the same patch/section. In this instance, the number of floats needed would be: 2×2×3=12, the quantity 2 representing the total number of global vectors for the section, the quantity 2 representing the total number of components per global vector used (i.e., position and angle components for each global), and the quantity 3 being the number of floats needed for each position and angle component. In comparison to the conventional number of floats (65×65=4,225), the present invention significantly reduces the cost for providing a representation of the displacement-mapped surface.

Optionally, the method of FIG. 2A includes the preliminary operations of displacing and tessellating (or otherwise partitioning) the surface so as to produce the displacement-mapped surface portions (e.g., tessellated polygons) for which the local vectors are defined. Alternatively, the method of FIG. 2A can be performed without the displacement and/or tessellation operations, e.g., if such operations have been previously performed.

As used herein, the terms "local vector" and "global vector" describe respective data sets, each of which includes the aforementioned position and angle data or values. In one embodiment, magnitude information of the local/global vector is omitted from its corresponding data set. In another embodiment, magnitude information of the local/global vector (which may have a predefined value, e.g., 1), is included in its corresponding data set. Furthermore, the local/global angles and/or positions may be defined in terms of a pre-defined ordinate system. For example, although each of the exemplary local/global angles defines a normal angle for the local/global vector relative to its corresponding surface portion, each surface portion is oriented at a different angle. Accordingly the local/global angles may be defined relative to a reference ordinate system within which the displacement-mapped surface is also defined. Similarly, the local/global positions may be defined in terms of such a reference ordinate system.

Figure 2B:
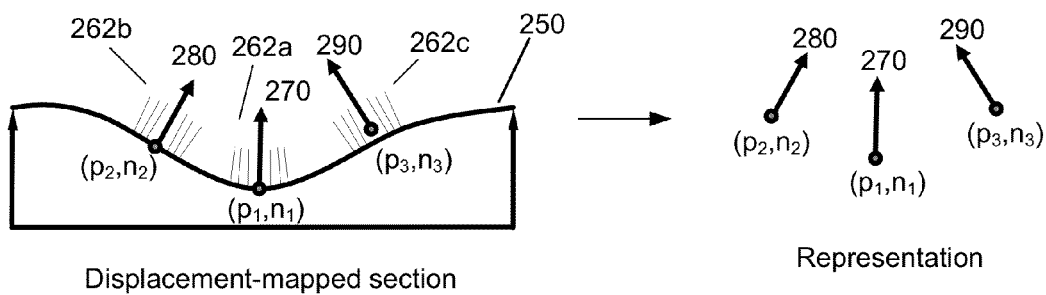
FIG. 2B illustrates a cross-sectional view of an exemplary displacement-mapped surface represented in accordance with the method of FIG. 2A.

FIG. 2B illustrates a cross-sectional view of an exemplary displacement-mapped surface represented in accordance with the method of FIG. 2A. As noted above, the displacement-mapped surface 250 may represent an undivided surface section, or an individual section/patch of a larger displacement-mapped surface.

The right most illustration shows the displacement mapped surface 250 (or portion thereof) having a plurality of local vectors 262 which are defined in accordance with operation 202, above. Each local vector extends from a surface portion, for example, from the center of tessellated polygon at an angle perpendicular to the tessellated polygon. Each local vector includes its local position and local angle information, as noted above. The local vectors 262 are grouped or clustered into three subsets 262a, 262b and 262c as shown. This distribution may represent an initial distribution of the local vectors, or alternatively, the local vectors may be grouped or clustered into the subsets using several techniques, for example, a clustering process, such as a k-means clustering process illustrated below.

The displacement-mapped surface 250 further includes global vectors 270, 280, and 290, each representing a respective subset of local vectors, in accordance with operation 204 above. The first, second and third global vectors are identified by sets/pairs $(p_1,n_1)$, $(p_2,n_2)$, and $(p_3,n_3)$, whereby the reference indicia "$p_i$" represents a global position, and the reference indicia "$n_i$" represents a global angle. The global position is computed as a function of all local positions included within the cluster the global vector represents, and the global angle is computed as a function of all local angles. For example, global position $p_1$ may represent the mean value of all local positions included within first cluster 262a, and global angle $n_1$ may represent the mean value of all local angles included within first cluster 262a. As can be observed from the third global vector 290, it can sometimes be the case that the global position (in this case $p_3$) is not located on the displacement-mapped surface as the local position values or the function used to compute the global position may not result in a position located on the displacement-mapped surface. Nonetheless, the three global vectors $(p_1,n_1)$, $(p_2,n_2)$, and $(p_3,n_3)$ can be utilized to form a representation of the surface 250 in accordance with operation 206 above, as shown in the left most illustration of FIG. 2B.

Figure 3:
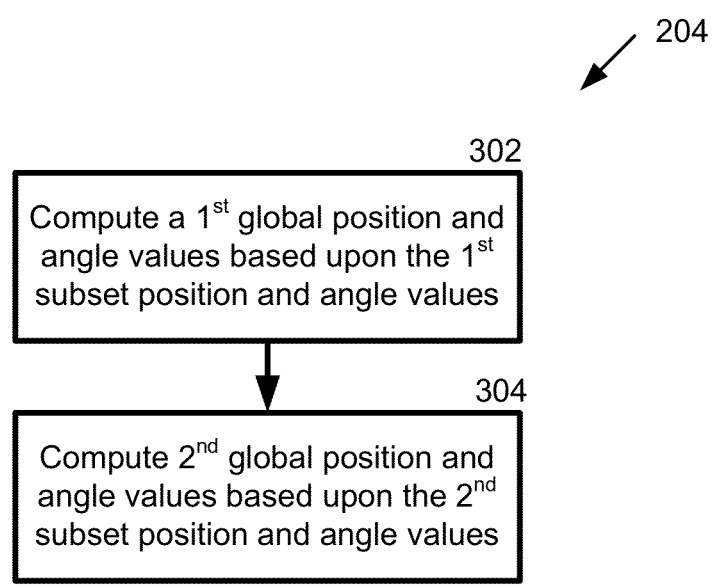
FIG. 3 illustrates an exemplary method for determining global vectors for a displacement-mapped surface in accordance with the method of FIG. 2A.

FIG. 3 illustrates an exemplary embodiment of operation 204 in which first and second global vectors are determined in accordance with the present invention. In an exemplary embodiment noted above, each local vector is characterized by (i.e., includes) a local position value and a local angle value. Determination of the first global vector is carried out by operation 302, in which a first global vector's position and angle values are computed. In particular, a first global position value is computed based upon the local position values of the first subset of local vectors, and a first global angle value is computed based upon the local angle values of the first subset of local vectors. In a particular embodiment, the aforementioned computations are mean value computations, as further described below. Determination of the second global vector is carried out by operation 304 in a similar manner in which a second global vector's position and angle values are computed based upon respective local position and angle values of the second subset of local vectors. In such an embodiment, operation 206 above is carried out by representing the displacement-mapped surface as a function of the first global position and angle values, and the second global position and angle values.

As noted above, the local vectors may be distributed along the displacement-mapped surface in any arrangement. In one embodiment, the distribution of the local vectors is modified, in particular, clustered from an initial distribution into subgroups or subsets of local vectors. In such an instance, a clustering algorithm is applied to the collective plurality of local vectors disposed over the displacement-mapped surface, the clustering algorithm operable to cluster the local vectors into the first and second subsets as described herein. Each cluster can be characterized by a local position mean value and a local angle mean value, each of which can be assigned as a corresponding global position and global angle of a global vector representing the cluster/subset. Any one of a variety of grouping or clustering techniques can be employed. For example, partitional clustering algorithms are especially useful, including k-means clustering, fuzzy c-means clustering, or quality threshold (QT) clustering algorithms. In the following exemplary embodiment described herein, a k-means clustering algorithm is employed, although the invention is not limited thereto.

Figure 4A:
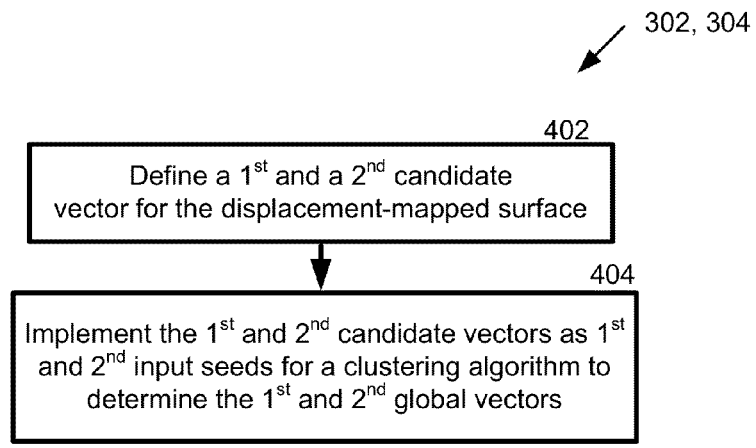
FIG. 4A illustrates an exemplary method for determining global vectors for a displacement-mapped surface in accordance with the method of FIG. 3.

FIG. 4A illustrates an exemplary embodiment for determining first and second global vectors in accordance with FIG. 3. At 402, first and second "candidate" vectors are defined. In a particular embodiment, the candidate vectors are local vectors, the selection of which may be performed in a variety of different manners. In one embodiment, a predefined distribution of local vectors (e.g., a linear distribution across the surface 250) is selected as the candidate vectors. In another embodiment, a group of randomly selected local vectors is implemented as the candidate values. In another embodiment, a cone template is employed to identify a plurality of local vectors as candidate vectors for the surface 250. This embodiment is further illustrated in FIG. 6 and described below. While a quantity of two candidate vectors are described in the illustrated embodiment, any plurality of candidate vectors may be selected instead. For example, 3, 4, 5, 6, 8, 10, 20, 50, 100, 1,000, 10,000, or more candidate vectors may be selected in alternative embodiments.

Once the candidate vectors are defined for the surface 250, they are implemented as input seeds with a clustering algorithm for determining the first and second global vectors (operation 404). As known in the art, clustering algorithms (e.g., k-means algorithms, fuzzy c-means algorithms, etc.) are used to assign n samples into k clusters. In the present application of this algorithm, each of the selected candidate vectors represents an initial centroid or mean value, this mean value composed of a position value and an angle value corresponding to the position and angle components of the candidate vector. Alternatively, the position and angle values may be combined to form a single mean value for the vectors. Subsequently, the clustering algorithm is executed, and a cluster/subset of local vectors is (potentially) formed around each candidate vector, whereby each local vector is assigned to that candidate vector having the nearest mean. Local vectors migrate towards, and cluster with the candidate vector having the most similar mean value. Upon the assignment of a new local vector to a cluster, the cluster's mean value is updated (e.g., by taking the mean value of the position and angle values of all local vectors within a cluster and defining those mean values as the position and angle values for the candidate vector), and based upon the updated mean value of the cluster, the position and angle values of each local vector is again tested against the updated mean value of each candidate vector to determine if there is any movement or re-assignment of local vectors between clusters. The clustering process may be repeated iteratively a predetermined number of times or until convergence is reached, whereby each local vector is assigned to the cluster having the closest mean value. The resulting position and vector angle of each candidate position is then taken as the position and vector angle of a corresponding global vector representing that cluster/subset of vectors.

In accordance with the foregoing, operation 404 is carried out by implementing the two or more candidate vectors as input seeds for the clustering algorithm, the clustering algorithm operating upon the plurality of local vectors to form first and second clusters/subsets of the local vectors. Each cluster/subset defines a local position mean value and a local angle mean value. The first global position is defined as including the local position mean value and the local angle mean value of the first cluster/subset, and the second global vector is defined as including the local position mean value and the local angle mean value of the second cluster/subset.

Figure 4B:
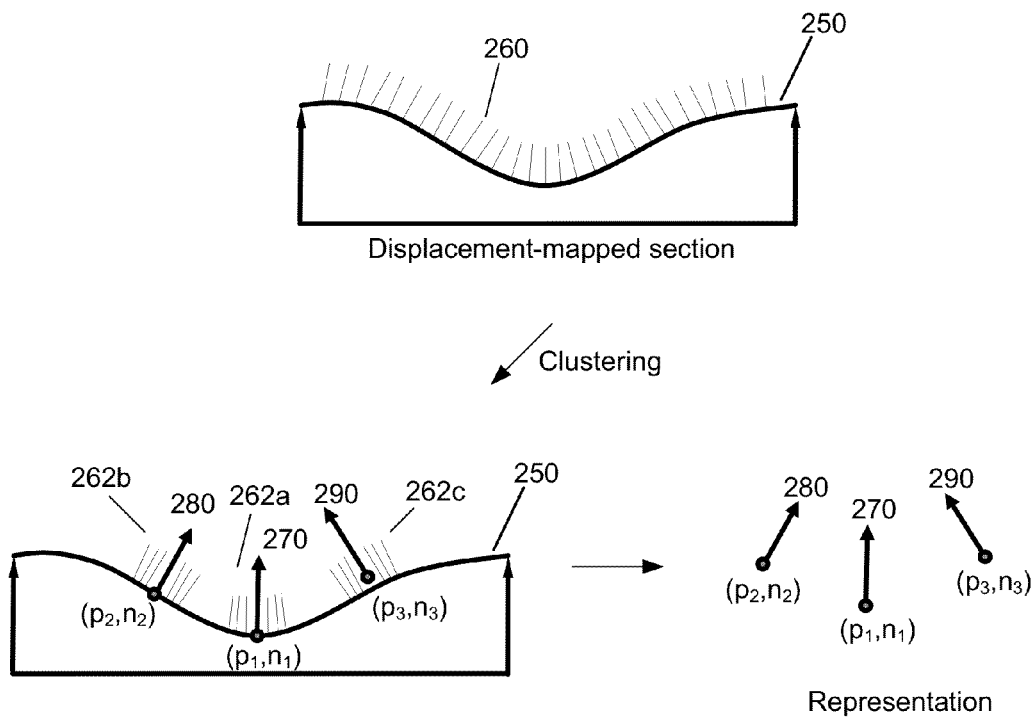
FIG. 4B illustrates a cross-sectional view of an exemplary displacement-mapped surface represented in accordance with the method of FIG. 4A.

The number of candidate vectors (seeds of the clustering algorithm) may number two or more. In one exemplary embodiment, the number of initially-selected candidate vectors ranges from 2-6. Further particularly, the number of candidate vectors may be reduced during iterations of the clustering process, when, for example, no local vectors become assigned to (i.e., cluster with) a particular candidate vector. In such a case, the candidate vector may be removed, and the remaining candidate vectors (and correspondingly, the number of implemented global vectors) may be less than the number initially selected at 402. In a particular embodiment of this process, the clustering process is used to reduce the number of clustered groups to one, whereby a single global vector can then be used to describe/represent the displacement-mapped surface. This embodiment is further described in FIGS. 7A and 7B below FIG. 4B illustrates a cross-sectional view of an exemplary displacement-mapped surface represented in accordance with the method of FIG. 4A. The top center illustration shows the surface 250 having a plurality of local vectors 260 distributed over the surface 250, in accordance with operation 202. The local vectors 260 are shown in a linear distribution over the surface 250, although any plurality in any distribution pattern (including a random distribution) may be alternatively chosen.

The bottom left illustration shows the surface 250 at the conclusion of operations 402 and 404, in which the three clusters or subsets 262a, 262b, and 262c of local vectors are formed as a result of applying a k-means clustering algorithm to the distribution of the local vectors 260 using three candidate vectors (candidate vectors not shown to avoid obscuring the drawing). Further shown are the first, second and third global vectors 270, 280 and 290 which are determined from the final clusters 262a, 262b and 262c, particularly, the position and angle values for each global vector being the mean values of the local position and local angle values of the local vectors within that cluster. The bottom right illustration shows the simplified surface representation provided by the method (operation 206), the representation being in the form of three global vectors 270, 280 and 290 and in particular, the global position and angle values of each $(p_1, n_1), (p_2, n_2), (p_3, n_3)$.

Figure 5A:
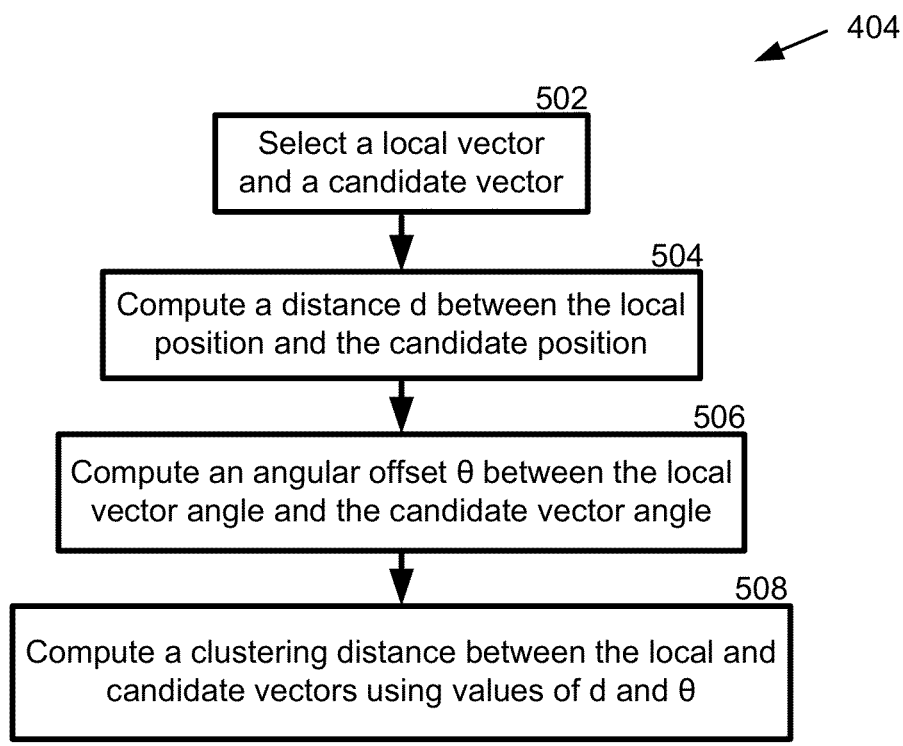
FIG. 5A illustrates an exemplary method for determining global vectors for a displacement-mapped surface in accordance with the method of FIG. 4A.

FIG. 5A illustrates an exemplary embodiment of operation 404 in which first and second global vectors are determined in accordance with the present invention. At 502, a local vector and the first candidate vector are selected for a comparison of their mean values, each of the local and first candidate vectors including position and angle parameters. At 504, a Euclidean distance $d_1$ is computed between the local and first candidate positions. At 506, an angular displacement $\theta_1$ is computed between the local and the first candidate angles. In an exemplary embodiment, the absolute value of the magnitude of these differences is computed in 504 and 506. At 508, a sum of the Euclidean distance $d_1$ and the angular displacement $\theta_1$ is computed to determine a first clustering distance value $D_1$:

$$D_1 = \theta_1 + d_1$$

Operations 502-508 are repeated for the second candidate vector, resulting in the computation of a second clustering distance value $D_2$:

$$D_2 = \theta_2 + d_2$$

If additional candidate vectors are implemented, operations 502-508 are repeated for each, resulting in a corresponding $n^{th}$ clustering distance value.

Once two or more of the clustering distance values have been computed, a comparison can be made as to which clustering distance is the shortest, and the local vector is clustered with the candidate vector providing the shortest distance. In the illustrated example in which the local vector is compared against each of the first and second candidate vectors to produce respective first and second clustering distance values $D_1$ and $D_2$, the local vector is clustered with the first candidate vector if $D_1 < D_2$, otherwise the local vector is clustered with the second candidate vector.

Further exemplary, weights $w_1$ and $w_2$ can be used to prevent either parameter $\theta$ or d from dominating the k-means distance computation. For example, when the angular displacement $\theta$ dominates parameter d, the local and candidate vectors may appear to have the same base positions, thereby making the computation of the separation parameter S error prone. A similar situation can occur when the angular displacement $\theta$ greatly outweighs distance d. By applying the appropriate weightings for $w_1$ and $w_2$, the difference can be more accurately computed, and the clustering algorithm more effective in generating global vectors which are used to form a representation of the surface.

The values of weights $w_1$ and $w_2$ can be adjusted empirically, or can be made dependent on the surface patch dimensions and the units they are measured in. For example, one requirement may be to have generally equal contributions from Euclidean distance and angles. As an illustrative example, a patch of 20 m per side is considered. The value of $w_2$ is preferably adjusted if the units are changed to km or mm, as the patch dimensions would change to 0.02 km or 20000 mm, respectively. Similarly, the weight would vary if the patch dimensions change. Angles may be measured in a defined range, for example radians.

In an embodiment in which N is constrained, and the number of output global vectors is limited, the surface shape may be most usefully captured if normals (vector angle values=90 degrees) dominate and $w_1 * \theta > w_2 * d$ in general, although this would also a function of the input data distribution. Where normals are similar, it may be further useful to distinguish them by their Euclidean separation and clustering of spatially contiguous local vectors may be preferred. Larger values of $w_2$ increase the dominance of the spatial clustering.

In an exemplary implementation, the values used are $w_2 = 10.0$ and $w_1 = 1.0$. Patch dimensions are numerically small: 0.03×0.03; thus inter-polygon distances, d, are even smaller at approximately range between 0.0005, 0.015. The values of angles $\theta$ will be data dependent, but in our exemplary implementation, for terrain, they may range from 0 to 20 degrees or between 0 and 0.35 radians. A value of $w_2 = 10$ puts the contributions of d and $\theta$ on a more equal footing, but with $w_1 * \theta$ dominating.

Figure 5B:
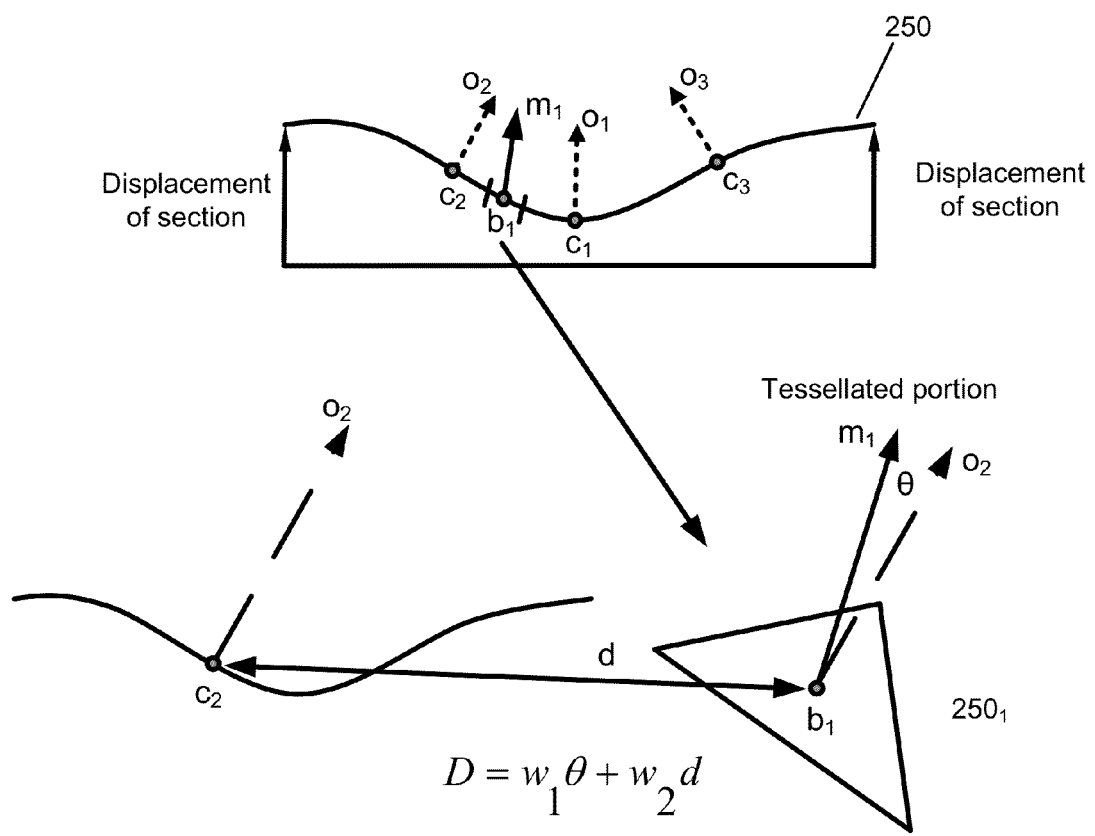
FIG. 5B illustrates an exemplary method for computing a clustering distance value between a local vector and candidate vector in accordance with the method of FIG. 5A.

FIG. 5B illustrates an exemplary operation of 508 in which a clustering distance value between a local vector and candidate vector is computed. In the example, a clustering distance is computed between a local vector $(b_1, m_1)$ and a candidate vector $(c_2, o_2)$.

Local vector $(b_1, m_1)$ identifies the center position and angle of its vector originating from a tessellated polygon $250_1$ included within the displacement-mapped surface 250. Per operations 506 and 508, a Euclidean distance d is computed between positions $c_2$ and $b_1$, and an angular displacement $\theta$ is computed between the angles $o_2$ and $m_1$. The clustering distance between the local and candidate vectors is computed according to the equation:

$$D = w_1 \theta + w_2 d$$

where $w_1$ and $w_2$ are respective weights for the angular displacement and distance between the positions of the candidate and local vectors.

Figure 6A:
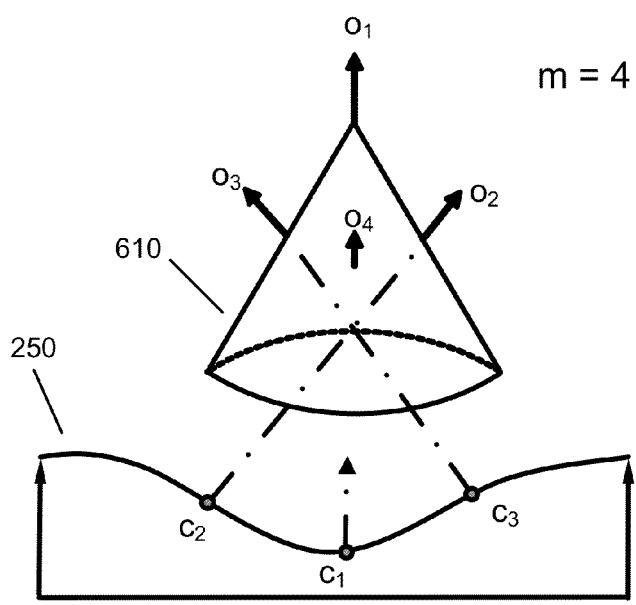
FIGS. 6A and 6B illustrates a cone template operable for assigning candidate vectors to a displacement-mapped section in accordance with the present invention.
Figure 6B:
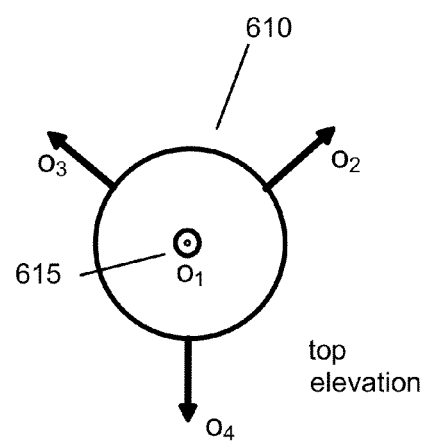

FIGS. 6A and 6B illustrate side and top views, respectively, of a cone template operable for assigning candidate vectors to a displacement-mapped surface in accordance with the present invention. The cone template 610 is disposed over the surface 250 and includes a cone circumference and a center axis 615 which is substantially centered on the surface 250. Four candidate vectors are determined for the surface 250 in the illustrated embodiment, i.e., the number of input seeds (m) for the k-means clustering process is four.

The first candidate vector $(c_1, o_1)$ identifies a position $c_1$ on the surface 250 and a vector angle $o_1$ which extends along the center axis 615 of the cone 610. The second, third, and forth candidate vectors $(c_2, o_2)$, $(c_3, O_3)$, $(c_4, o_4)$ identifies respective positions $c_2$, $c_3$, and $c_4$ (position $c_4$ not shown) on the surface 250, such that their corresponding angles $o_2$, $o_3$, and $o_4$ are normal to the cone surface and their respective vectors extend to intersect the cone at equally space intervals around the circumference of the cone. In the illustrated embodiment, four candidate vectors are employed, however any number of m candidate vectors can be employed, whereby one of the candidate vectors is implemented to identify a center point on the surface 250 and an angle along the center axis thereof, and the remaining (m−1) candidate vectors identify positions on the surface 250 such that their corresponding angles are normal to the cone surface and the corresponding vectors extend to intersect the cone at equally-space intervals around the circumference of the cone. The slope of the sides of the cone is chosen to be generally representative of the displaced patches. Further particularly, the cone template is specifically implemented for a displacement-mapped surface 250 having a high density of inflection points, e.g., a "terrain type" of displacement-mapped surface. In that implementation, the slope of the cone sides is chosen to be about 20-30 degrees off horizontal.

The foregoing embodiments in which two or more global vectors are used to provide a simplified representation of a displacement-mapped surface can be advantageous employed for many surfaces from simple to complex, as the number of global vectors can be selected based upon the order surface complexity versus the encoding efficiency desired. In addition to these foregoing embodiments, another embodiment of the invention includes providing a representation of a displacement-mapped surface using a single global vector for even greater encoding efficiency. This technique can be used for low complexity surfaces, such as flat surface, with little no degradation in the quality of the rendering. In particular, the afore-described k-means algorithm can employed to converge local vectors defined over the surface into a single cluster, the single cluster defining a local position mean value and a local angle mean value which can be used as the global position and angle values for the single global vector representing the surface.

Figure 7A:
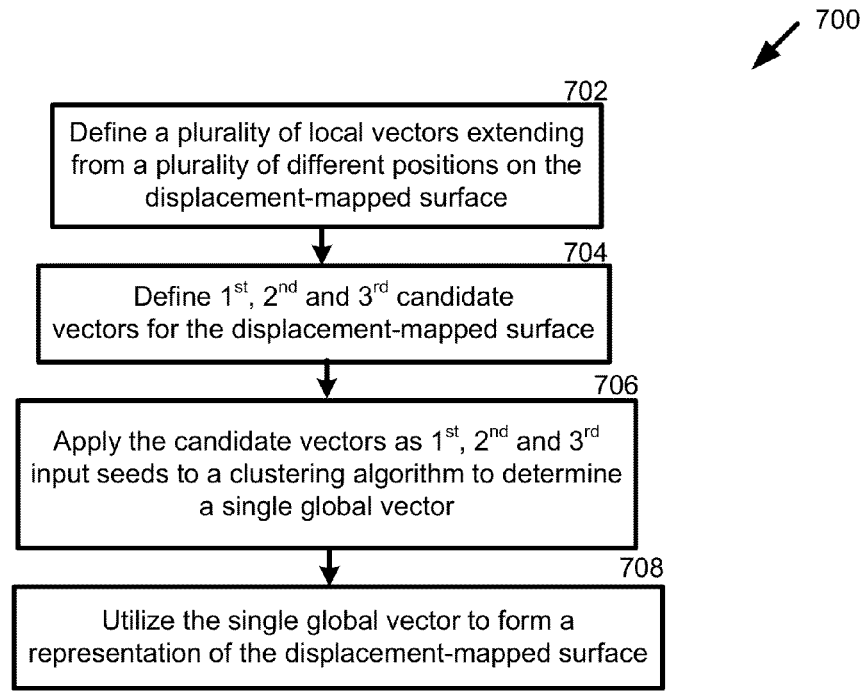
FIG. 7A illustrates a second exemplary method for constructing a displacement-mapped surface representation in accordance with the present invention.

FIG. 7A illustrates an exemplary method for constructing a displacement-mapped surface representation using a single global vector in accordance with the present invention. At 702, a plurality of local vectors is defined on a displacement-mapped surface, each of the local vectors extending from a respective plurality of different positions disposed on the displacement-mapped surface. In a particular embodiment, operation 702 is carried out in the same manner as operation 202, described and illustrated above.

At 704, first, second, and third candidate vectors are defined. In a particular embodiment, operation 704 is carried out in the same manner as operation 402 described and illustrated above. While three candidate vectors are illustrated, it will be understood that any plurality (two or more) of candidate vectors may be alternatively implemented, as noted in the operation of 402 above.

At 706, the first, second and third candidate vectors are applied as first, second and third input seeds, respectively, to a clustering algorithm (e.g., a k-means clustering algorithm, a fuzzy c-means clustering algorithm, etc.) to determine a single global vector for the local vectors. In a particular embodiment, operation 706 is carried out according to operation 404 described and illustrated above, with the exception that implementation of the clustering algorithm results in the formation of a single cluster of local vectors, the single cluster defining a local position mean value and a local angle mean value based upon all positions and angles of the clustered local vectors. The local position and local angle mean values define the global position and angle parameters of the global vector 720, and accordingly this vector can be utilized to provide a simplified representation of the displacement-mapped surface 750 per operation 708. In a further specific embodiment of operation 706, operations 502-508 may be performed.

Figure 7B:
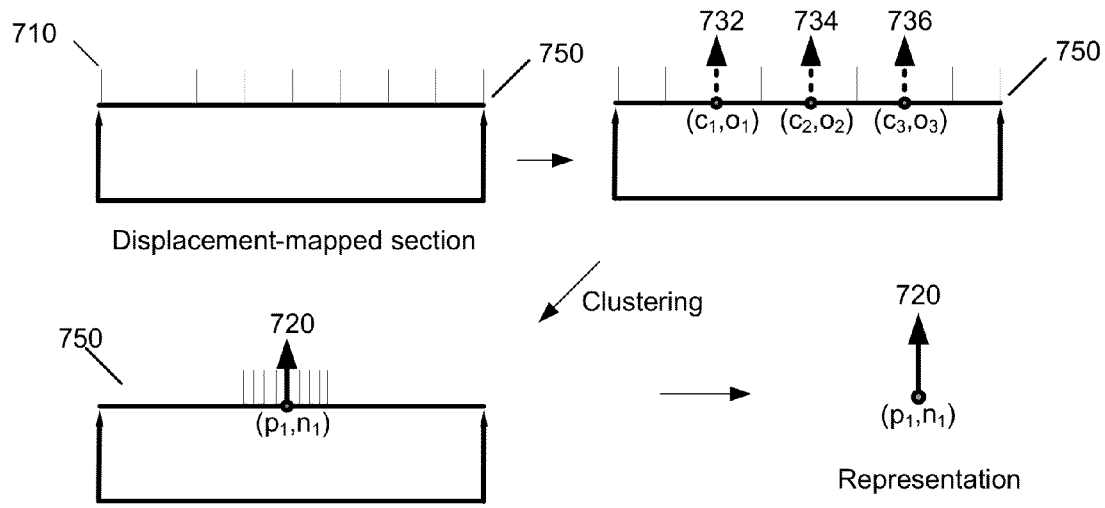
FIG. 7B illustrates a cross-sectional view of an exemplary displacement-mapped surface represented in accordance with the method of FIG. 7A.

FIG. 7B illustrates a cross-sectional view of an exemplary displacement-mapped surface represented in accordance with the method of FIG. 7A. The top left illustration shows the surface 750 having a plurality of local vectors distributed over the surface 750, in accordance with operation 702. Nine local vectors are shown in a linear distribution over the surface 750, although any plurality in any distribution pattern (including random) may be alternatively chosen. The top right illustration shows first, second and third candidate vectors 732, 734 and 736 defined for the local vectors 710, in this case the third, fifth and seventh local vectors (as numbered from left to right) are chosen as the candidate vectors 732, 734 and 736 in accordance with operation 704.

The bottom left illustration shows the surface 750 once the k-means clustering process has been performed to produce a single cluster or local vectors, the mean value of the position and angle defining the global position and angle of the single global vector 720, in accordance with operation 706. The bottom right illustration shows the surface representation provided by the method (operation 708), the representation being in the form of the single global vector 720, and in particular, the global position and angle values $(p_1, n_1)$.

In a particular application, the operations of FIGS. 2A, 3, 4, 5A and 7A are carried out as a part of a pre-processing phase in a graphics rendering process, the pre-processing phase including an operation in which the surface 250 is fully tessellated and displaced. A center position of each tessellated polygon and an angle for providing a normal vector extending therefrom is subsequently computed, this data forming the local position and local angle data described in operation 202. In accordance with operations 204 and 304, m-number of candidate vectors are employed as input seeds for a k-means clustering algorithm for clustering the plurality of local vectors into subsets, each subset represented by a global vector. The collective plurality of global vectors, and particularly the position and angle of each, can then be used to subsequently represent/construct the surface 250.

Once pre-processing of the displacement-mapped surface 250 has been performed and the corresponding global vectors determined according to the present methods described herein, the global vectors can be used as a representation of displacement-mapped surface 250. As noted above, the compact representation of the global vectors achieves significant savings in memory capacity and processing bandwidth compared to the conventional techniques used to provide a representation of displacement-mapped surfaces.

Further particularly, the global vectors can be used to intelligently construct the underlining surface itself at the appropriate level of detail. In general, lower complexity surfaces will be represented by a smaller number of representative global vectors (e.g., 1 or 2), and higher complexity surfaces will be represented by a larger number of global vectors (e.g., 3-8). Based upon this, the number of global vectors associated with a particular surface can be used to determine whether to finely or coarsely tessellate the base surface in order to achieve the required level of detail. Such information can provide efficiencies when fine tessellation of an underling surface is not required for a low complexity displacement-mapped surface.

In the foregoing manner, the shape and orientation of a displaced, tessellated surface or patch thereof can be represented in a compact form utilizing two or more global vectors. The representation is small enough, for example, that many tessellation sections can be efficiently represented in a small amount memory, e.g., in GPU shader constants or constant buffers, and compact enough to be analyzed dynamically in a shader, e.g., a DIRECTX 11 (DX11) tessellation control shader. Notwithstanding its compact size, the representation permits useful calculations on the properties of the section as a whole. For example, silhouette detection techniques can be performed on the surface 250, whereby the global positions and angles representing the displacement-mapped surface 250 are employed for the silhouette detection computations.

The present invention may be implemented as a processor which is configured to perform the operations as described herein to construct a representation of a displacement-mapped surface. The processor may be a scalar processor operable to perform operations upon one data element, or a vector/array processor (e.g., a SIMD architecture) operable to perform operations of multiple data elements simultaneously. The processor may be implemented in various forms, for example, a central processing unit (CPU) intended to operate centrally within a computer or other programmable system. In another embodiment, the processor is implemented as a graphics processing unit (GPU) which may be adapted for visual computing applications, or alternatively, as a general purpose GPU (GPGPU) implemented to carry out many functions normally performed by a CPU. In another embodiment, the processor may be implemented as a microprocessor embedded within a larger/more complex device or system, the microprocessor omitting memory or other peripheral components provided by the larger device/system. A non-exhaustive list of the aforementioned systems which may incorporate the processor of the present invention includes computers, workstations, cellular telephones, game consoles, and motherboards. The improved representation of the present invention can be implemented, e.g., to provide a graphics rendering process which is more computationally efficient compared to conventional techniques. Exemplary applications using the improved representation include computer games, flight simulation, geographic information systems, medical imaging, and other applications in which graphics rendering is used.

Figure 8:
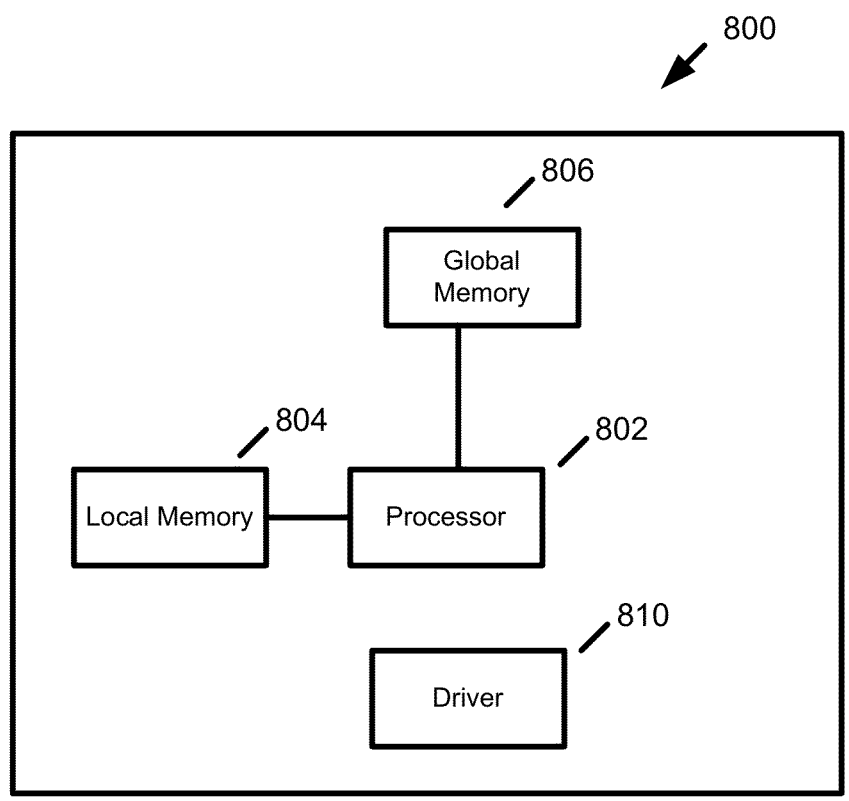
FIG. 8 illustrates a system operable to compute a representation of the displacement-mapped surface in accordance with the present invention.

FIG. 8 illustrates an exemplary graphics processing sub-system 800 employing a processor 802 operable to perform the operations illustrated in accordance with the present invention. In one embodiment, processor 802 is a parallel processing architecture, such as a single instruction multiple data (SIMD) architecture of a predefined width or "warp," for example 32, 64, 128, or 256 threads. Further particularly, the processor 802 includes processor circuitry (e.g., the digital and logic circuitry) operable to perform the operations of each of the methods as described herein. In particular embodiments, the processor 802 is operable to perform any one or more of the operations illustrated in any of FIGS. 2A, 3, 4, 5A and 7A.

The processor 802 may further include local memory 804 which is physically or logically allocated to the processor. The sub-system 800 may also include a global memory 806 which is accessible to each of the processors. The system 800 may further include one or more drivers 810 for controlling the operation of the sub-system 802 in accordance with the methods described herein. In one embodiment, the sub-system 800 is included within in a graphics card. In another embodiment, the sub-system 800 is included within the motherboard of a computer or workstation or on a game console. In another embodiment, the sub-system is realized in an embedded system, such as in a cellular telephone.

In a particular embodiment of the invention, a memory (e.g., global memory 806) is operable to store instructions for performing any of the operations of the present invention, including those illustrated in FIGS. 2A, 3, 4, 5A and 7A. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

As readily appreciated by those skilled in the art, the described processes and operations may be implemented in hardware, software, firmware or a combination of these implementations as appropriate. In addition, some or all of the described processes and operations may be implemented as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the claimed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for constructing a displacement-mapped surface representation, the method comprising:

defining, by a processor, a plurality of local vectors emanating from the displacement-mapped surface, each local vector extending from a local position disposed on the displacement-mapped surface at an local angle relative to the displacement-mapped surface at said local position;

determining, for a first subset of the plurality of the local vectors, a first global vector, the first global vector determined as a function of the local positions and the local angles of the first subset of local vectors, wherein said first subset maintains an initial distribution of local vectors comprising said first subset;

determining, for a second subset of the plurality of the local vectors, a second global vector, the second global vector determined as a function of the local positions and the local angles of the second subset of local vectors, wherein said second subset maintains an initial distribution of local vectors comprising said second subset; and utilizing the first and second global vectors to form a representation of the displacement-mapped surface.

2. The method of claim 1, further comprising determining, for a third subset of the plurality of the local vectors, a third global vector, the third global vector defined as a function of the local positions and the local angles of the first subset of local vectors, wherein utilizing comprises utilizing each of the first, second and third global vectors to form a representation of the displacement-mapped surface.

3. The method of claim 1, wherein each of the local angles comprises a normal angle.

4. The method of claim 1, wherein the displacement-mapped surface comprises a plurality of tessellated polygons, and wherein a respective one of the plurality of local vectors perpendicularly extends from a center position of a respective one of the tessellated polygons.

5. The method of claim 1, wherein determining a first global vector comprises computing (i) a first global position based upon the local positions of the first subset of local vectors, and (ii) a first global angle based upon the local angles of the first subset of local vectors; and wherein determining a second global vector comprises computing (i) a second global position based upon the local position of the second subset of local vectors, and (ii) a second global angle based upon the local angle of the second subset of local vectors.

6. The method of claim 5, wherein utilizing the first and second global vectors comprises utilizing the first global position, the first global angle, the second global position and the second global angle to form a representation of the displacement-mapped surface.

7. A processor operable to construct a displacement-mapped surface representation, the processor comprising:

processor circuitry operable to define a plurality of local vectors emanating from the displacement-mapped surface, each local vector extending from a local position disposed on the displacement-mapped surface at an local angle relative to the displacement-mapped surface at said local position;

processor circuitry operable to determine, for a first subset of the plurality of the local vectors, a first global vector, the first global vector determined as a function of the local positions and the local angles of first local vectors, wherein said first subset maintains an initial distribution of local vectors comprising said first subset;

processor circuitry operable to determine, for a second subset of the plurality of the local vectors, a second global vector, the second global vector determined as a function of the local positions and the local angles of the second subset of local vectors, wherein said second subset maintains an initial distribution of local vectors comprising said second subset; and processor circuitry operable to form a representation of the displacement-mapped surface utilizing the first and second global vectors.

8. The processor of claim 7, wherein the processor circuitry operable to determine a first global vector comprises processor circuitry operable to compute (i) a first global position based upon the local positions of the first subset of local vectors, and (ii) a first global angle based upon the local angles of the first subset of local vectors; and wherein the processor circuitry operable to determine a second global vector comprises processor circuitry operable to compute (i) a second global position based upon the local positions of the second subset of local vectors, and (ii) a second global angle based upon the local angles of the second subset of local vectors.

9. The processor of claim 7, wherein the processor comprises a graphics processor implemented within a graphics processing sub-system.

10. A computer program product, resident on a non-transitory computer-readable medium, for providing instructions to construct a representation a displacement-mapped surface, the computer program product comprising:

instruction code for defining a plurality of local vectors emanating from the displacement-mapped surface, each local vector extending from a local position disposed on the displacement-mapped surface at an local angle relative to the displacement-mapped surface at said local position;

instruction code for determining, for a first subset of the plurality of the local vectors, a first global vector, the first global vector determined as a function of the local positions and the local angles of the first subset of local vectors, wherein said first subset maintains an initial distribution of local vectors comprising said first subset;

instruction code for determining, for a second subset of the plurality of the local vectors, a second global vector, the second global vector determined as a function of the local positions and the local angles of the second subset of local vectors, wherein said second subset maintains an initial distribution of local vectors comprising said second subset; and instruction code for forming a representation of the displacement-mapped surface utilizing the first and second global vectors.

11. The computer program product of claim 10, wherein the instruction code for determining a first global vector comprises instruction code for computing (i) a first global position based upon the local positions of the first subset of local vectors, and (ii) a first global angle based upon the local angles of the first subset of local vectors; and wherein the instruction code for determining a second global vector comprises instruction code for computing (i) a second global position based upon the local positions of the second subset of local vectors, and (ii) a second global angle based upon the local angles of the second subset of local vectors.

\* \* \* \* \*